United States Patent
Wang et al.

(10) Patent No.: US 6,856,719 B2
(45) Date of Patent: Feb. 15, 2005

(54) OPTICAL SWITCH SYSTEM

(75) Inventors: Lin T. Wang, Fremont, CA (US); Yale Zhang, Sunnyvale, CA (US); Yuqiao Liu, Sunnyvale, CA (US); Wei-Shin Tsay, Saratoga, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 135 days.

(21) Appl. No.: 10/097,112

(22) Filed: Mar. 11, 2002

(65) Prior Publication Data

US 2003/0002105 A1 Jan. 2, 2003

(Under 37 CFR 1.47)

Related U.S. Application Data

(60) Provisional application No. 60/274,949, filed on Mar. 12, 2001.

(51) Int. Cl.[7] .................................................. G02B 6/26
(52) U.S. Cl. .......................................... 385/17; 398/130
(58) Field of Search ............................. 385/17, 16, 24, 385/27, 31, 39; 398/129, 130, 131, 107, 108, 118, 119

(56) References Cited

U.S. PATENT DOCUMENTS

| | | | | |
|---|---|---|---|---|
| 6,519,060 B1 | * | 2/2003 | Liu | 398/49 |
| 6,542,268 B1 | * | 4/2003 | Rotolo et al. | 369/44.23 |
| 6,708,000 B1 | * | 3/2004 | Nishi et al. | 398/1 |
| 2002/0044319 A1 | * | 4/2002 | Kashima | 359/128 |
| 2003/0179985 A1 | * | 9/2003 | Zhou | 385/16 |

* cited by examiner

*Primary Examiner*—Akm Enayet Ullah
(74) *Attorney, Agent, or Firm*—Joe Zheng

(57) ABSTRACT

The inventions invention relates to a generic re-configurable WDM optical cross connection device which may be viewed as an optical network element comprising transport interfaces optionally along with tributary interfaces. An switch system includes a plurality of switch modules each essentially including a pair of R-channel input collimators on one side and a pair of R-channel output collimators on the other side with a switching prism moveably positioned therebetween in an existence/active or non-existence/inactive manner. A pair of input fibers are respectively connected to the two input collimators and an pair of output fibers are respectively connected t the two output collimators. A plurality of jumper fibers cascading said switch modules together.

29 Claims, 10 Drawing Sheets

OPTICAL SWITCH SYSTEM

This is a non-provisional application claiming benefit of the copending provisional application with a Ser. No. of 60/274,949 filed on Mar. 12, 2001.

BACKGROUND OF THE INVENTION

1. Field of The Invention

The invention is related to an optical switch assembly, and particularly to the optical transport interface functioning as a cross connector device in a WDM (Wavelength Division Multiplexed) system.

2. The Related Art

Wavelength Division Multiplexed (WDM) systems enable existing transport networks to provide increased bandwidth without deploying duplicate overlay networks. The WDM system enables a new level of flexibility in the network—the ability to use the wavelengths for routing, cross connecting or even adding/dropping, etc. Along with these abilities to route wavelengths, the WDM network may also provide the capability to support wavelength survivability. To use WDM systems in this manner requires more sophisticated optical network elements. Thus, a re-configurable WDM cross connection device is one of such elements.

Articles titled "Many approaches taken for all-optical switching" and "Matrix optical switches enable wavelength-selective crossconnects" in the August, 2001 issue of *Laser Focus World*, disclose several optical switches, of which some require simultaneously precisely positioning the matrix type reflection mirrors relative to the input/output ports for transporting a great number of signals. Anyhow, in some conditions a compact sized switch with few signals transported therein is desired in the industry.

SUMMARY OF THE INVENTION

The inventions invention relates to a generic re-configurable WDM optical cross connection device which may be viewed as an optical network element comprising transport interfaces optionally along with tributary interfaces. An switch system includes a plurality of switch modules each essentially including a pair of R-channel input collimators on one side and a pair of R-channel output collimators on the other side with a switching prism moveably positioned therebetween in either an existence/active or non-existence/inactive manner. A pair of input fibers are respectively connected to the two input collimators on the one (input) side of the whole system, either of the same switch module or of the two different switch modules on the input side of the whole system. Similarly, a pair of output fibers are respectively connected to the two output collimators on the other (output) side of the whole system. Two sets of input jumper fibers are arranged to respectively start from the corresponding input collimators for cross-connecting to the rest of the input collimators in sequence wherein each set of the input jumper fibers only interconnects one input collimator for each individual switch module and leaves the other input collimator of each individual switch module for the other set of the input jumper fibers. Two sets of output jumper fibers are arranged to connect the output collimators by a same principle except that the last output jumper fiber of each set is terminated at the same output collimator where the output fiber is located. The number (N) of the switch modules corresponds to the number of different WDM channels (i.e., wavelengths at ITU grid) of the transmitted signals, in the input/output fibers, requiring routing flexibilities thereof.

Under this arrangement, by respectively having the individual switching prisms in either existence or non-existence position, the first set of input N channels in the first input fiber and the second set of input N channels in the second input fiber can be rearranged into the first set of output N channels in the first output fiber and the second set of output N channels in the second output fiber wherein some channels from the first set of input N channels are switched/exchanged with some of the second set of input N channels so as to substitute each other in the corresponding first set of output N channels and second set of output N channels. The total varieties/possibilities of this rearrangement of these N channels are $(M!)^N$ in this current exemplary system wherein M is the number of the input or output fibers.

In one exemplary complete application system, there are two input fibers and two output fibers with different WDM channels in each fiber respectively as the transport interfaces. As controlled by the switching prisms, N1 channels can be either selectively cross-connected to another output fiber or remaining as direct pass express channels. The system can also selectively add/drop N2 channels from one transport interface with additional N2 input(add) fibers and N2 output(drop) fibers, respectively, as the tributary interfaces, controlled by a different set of switching prisms at a different set of wavelengths from N1 channels. The system can further additionally selectively add/drop N3 channels from another transport interface with additional N3 input fibers and N3 output fibers as the tributary interfaces, controlled by another different set of switching prisms at another different set of wavelengths from N1. All other remaining wavelengths directly pass through the system as express channels in the transport interface. In case N1=0, the system functions as a pure reconfigurable add/drop device; in case N2=N3=0, the system functions as a pure cross connector device.

DETAILED DESCRIPTION OF THE PREFERRED EMBODIMENTS

Figure 1A:
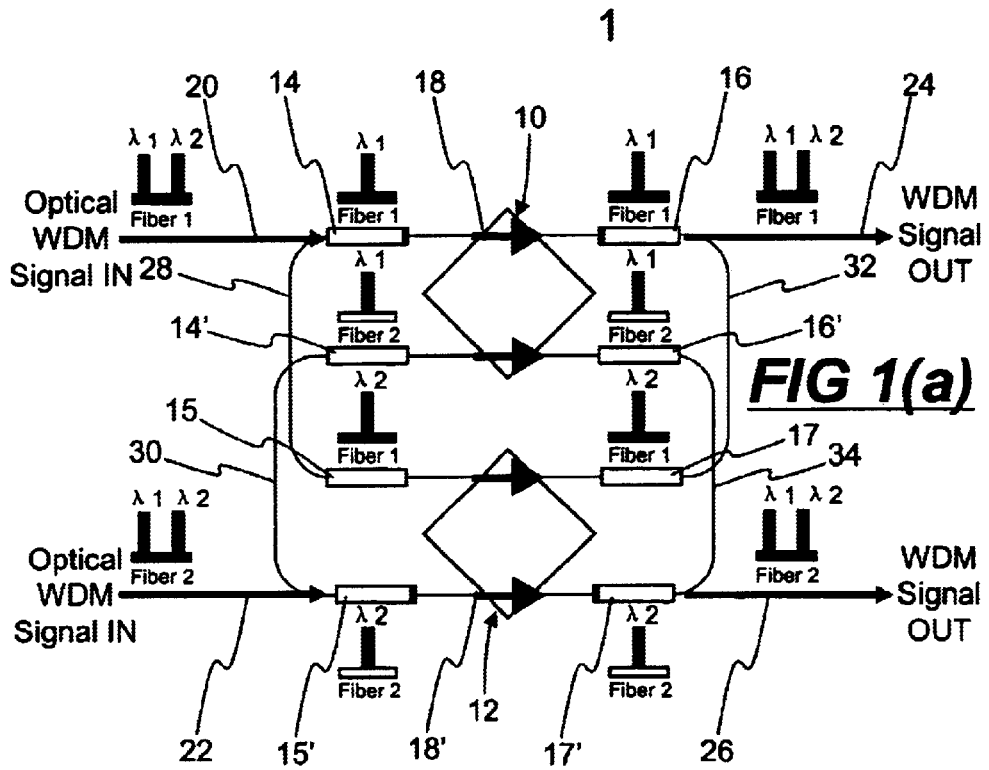
FIGS. 1(*a*)–1(*d*) are diagrams to respectively show different outcomes with the same input by an optical switch system according to the invention for switching two different channels.

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numerals throughout the various figures in the embodiments.

Attention is directed to FIGS. 1(a)–1(d) wherein an optical switch system 1 includes first and second switch modules 10, 12. The first switch module 10 includes a pair of input/output collimator assemblies arranged with a pair of R-channel first input collimators 14/14' on one side, and a pair of R-channel first output collimators 16/16' on the other side with a prism 18 moveably positioned therebetween in an existence or non-existence manner, wherein both the first input collimators 14/14' and the first output collimators 16/16' allow the wavelength $\lambda_1$ to pass and reflect others. The second module 12 similarly including another pair of input/output collimator assemblies arranged with a pair of R-channel second input collimators 15/15' on the same side with the first input collimators 14/14', and a pair of R-channel second output collimators 17/17' on the same side with the first output collimators 16/16' while being opposite to said pair of second input collimators 15/15', a prism 18' moveable positioned between the pair of second input collimators 15/15' and the pair of second output collimators 17/17', wherein both the second input collimators 15/15' and the second output collimators 17/17' allow the wavelength $\lambda_2$ to pass and reflect others.

First and second input fibers 20, 22 are respectively connected to the first input collimator 14 of the first switch module 10 and the second input collimator 15' of the second module 12. Similarly, first and second output fibers 24, 26 are respectively connected to the first output collimator 16 of the first module 10 and the second output collimator 17' of the second module 12.

First and second sets of input jumper fibers 28, 30 are arranged to respectively start from the input collimators, where the input fibers are connected, for cross-connecting to the rest of the input collimators of other modules in sequence where each set of the input jumper fibers only interconnects one input collimator for each individual module and leaves the other input collimator of each module for the other set. In this embodiment, the first set of input jumper fiber 28 connects the first input collimator 14 of the first module 10, where the first input fiber 20 is located, to the first input collimator 15 of the second module 12, where the second input fiber 22 is not located. Similarly, the second set of input jumper fiber 30 connects the second input collimator 15' of the second module 12, where the second input fiber 22 is located, to the second collimator 14' of the first module 10, wherein the first input fiber 20 is not located.

Similar to the arrangement of the input jumper fibers 28, 30, first and second sets of output jumper fibers 32, 34 are configured to respectively start from the output collimators, where the output fibers are connected, for cross-connecting to the rest of the output collimators of other modules in sequence where each set of the output jumper fibers only interconnects one output collimator for each individual module and leaves the other output collimator of each module for the other set. Thus, in this embodiment the first set of output jumper fiber 32 connects the first output collimator 16 of the first module 10, wherein the first output fiber 24 is located, to the first output collimator 17 of the second module 12, where the second output fiber 26 is not located. Similarly, the second set of output jumper fiber 34 connects the second output collimator 17' of the second module 12, where the second output fiber 26 is located, to the second output collimator 16' of the first module 10, where the first output fiber 24 is not located.

Understandably, the existence of the prism 18 switches the light paths of the pair of input/output collimator assemblies in each module, as illustrate in a related copending application Ser. No. 09/750,737 filed on Dec. 29, 2000 now pending having one common inventor with the instant invention.

Therefore, with existence or non-existence of the switching prism 18/18' in each module 10, 12, there are four variations/possibilities of the outcome of the system 1 when light including both signals of $\lambda_1$ and $\lambda_2$ appears in each of said first input fiber 20 and the second input fiber 22.

As shown in FIG. 1(a) where both the switching prisms 18 of the first and second modules 10, 12 are of non-existence, the light including first group signals of $\lambda_1$ and $\lambda_2$, (i.e., the first $\lambda_1$ signal and the first $\lambda_2$ signal), enters the first input fiber 20 and the light including second group signals of $\lambda_1$ and $\lambda_2$, i.e., the second $\lambda_1$ signal and the second $\lambda_2$ signal), enters the second input fiber 22.

Under this situation, (I) the first $\lambda_1$ signal in the input fiber 20 passes the first input collimator 14 into and then further passes the first output collimator 16, and enters the first output fiber 24;

(II) the first $\lambda_2$ signal in the first input fiber 20 is reflected by the first input collimator 14 and enters the second input collimator 15 via the first input jumper fiber 28, successively enters the second output collimator 17 further toward the first output collimator 16 via the first output jumper fiber 32, and finally is reflected by the first output collimator 16 to join the first $\lambda_1$ signal in the first output fiber 24;

(III) similar to the path pattern of the first $\lambda_1$ signal as illustrated in (I), the second $\lambda_2$ signal passes the second input collimator 15' into and further passes the second output collimator 17', and enters the second output fiber 26;

(IV) similar to the path pattern of the first $\lambda_2$ signal as illustrated in (II), the second $\lambda_1$ signal of in the second input fiber 22 is first reflected by the second input collimator 15' and enters the first input collimator 14' via the second input jumper fiber 30, further enters the first output collimator 16' and further enters the second output collimator 17' and finally is reflected by the second output collimator 17' to join the second $\lambda_2$ signal in the second.

In this arrangement, because none of the switching prisms 18 is of existence, the first output fiber 24 still carries the same first $\lambda_1$ signal and first $\lambda_2$ signal as those in the first output fiber 20, and the second output fiber 26 still carries the same second $\lambda_1$ signal and second $\lambda_2$ signal as those in the second output fiber 20. In other words, no switching effect is provided.

Figure 1B:
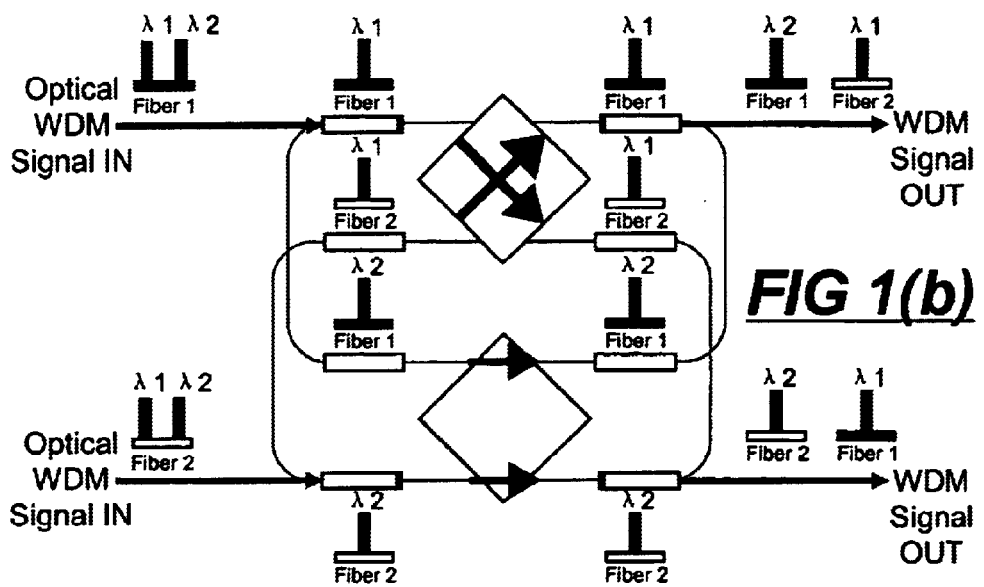
Figure 2A:
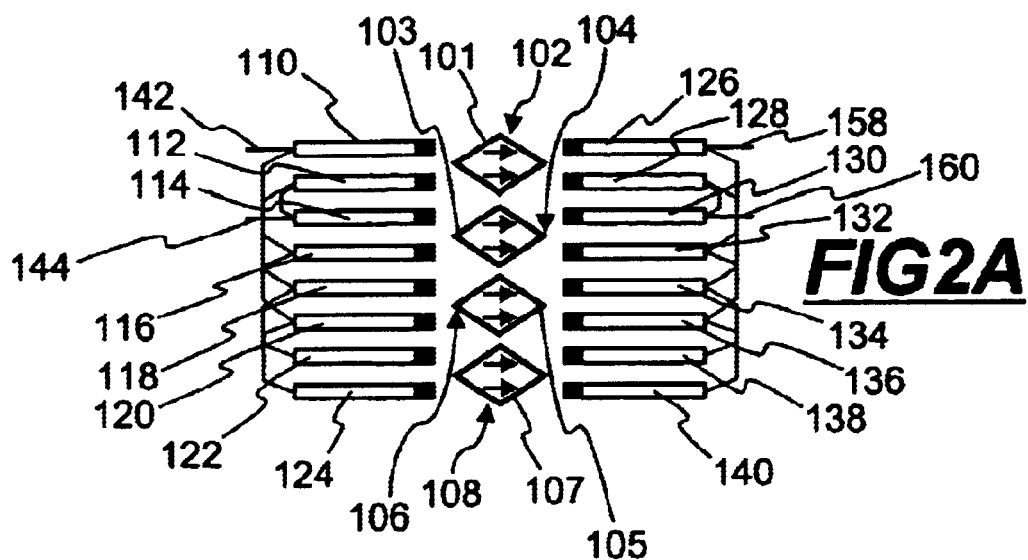
FIGS. 2(*a*)–2(*p*) are diagrams to respectively show a plurality of variable outcomes based on anther embodiment for switching four different channels.

FIG. 1(b) shows the prism 18 of the first module 10 is provided while the prism 18' is not provided therewith, to switch the light paths between the pair of collimator assembly in the first module 10. Under this situation, the first $\lambda_2$ signal in the first input fiber 20 travels the same path as what is shown in FIG. 2(a) and enters the first output fiber 24, and the second $\lambda_2$ signal in the second input fiber 22 travels the same path as what is shown in FIG. 2(a) and enters the second output fiber 24 because the second module 12, which regulates/controls the signals of $\lambda_2$, has no switching function thereof. Differently, the first $\lambda_1$ signal in the first input fiber 20 enters the first input collimator 14 while is switched, by the prism 18 of the first module 10, to the first output collimator 16' instead of the first output collimator 16, and finally enters the second output fiber 26 to join the second $\lambda_2$ signal in the second output fiber 26. On the other hand, the second $\lambda_1$ signal in the second input fiber 22 entering the first input collimator 14', is switched, by the same prism 18 of the first module 10, to the first output collimator 16 instead of the first output collimator 16', and finally enters the first output fiber 24 to join the first $\lambda_2$ signal in the first output fiber 24. Therefore, the first output fiber 24 carries the original first $\lambda_2$ signal from the first input fiber 20 while with the second $\lambda_1$ signal from the second input fiber 22. Correspondingly, the second output fiber 26 carries the original second $\lambda_2$ signal from the second input fiber 22 while with the first $\lambda_1$ signal from the first input fiber 20. In conclusion, the signals of $\lambda_1$ in the first and second input fibers 20, 22 are switched with each other because of existence of the prism 18 in the first module 10 which is intended to control/regulate the signals of $\lambda_1$.

Figure 1C:
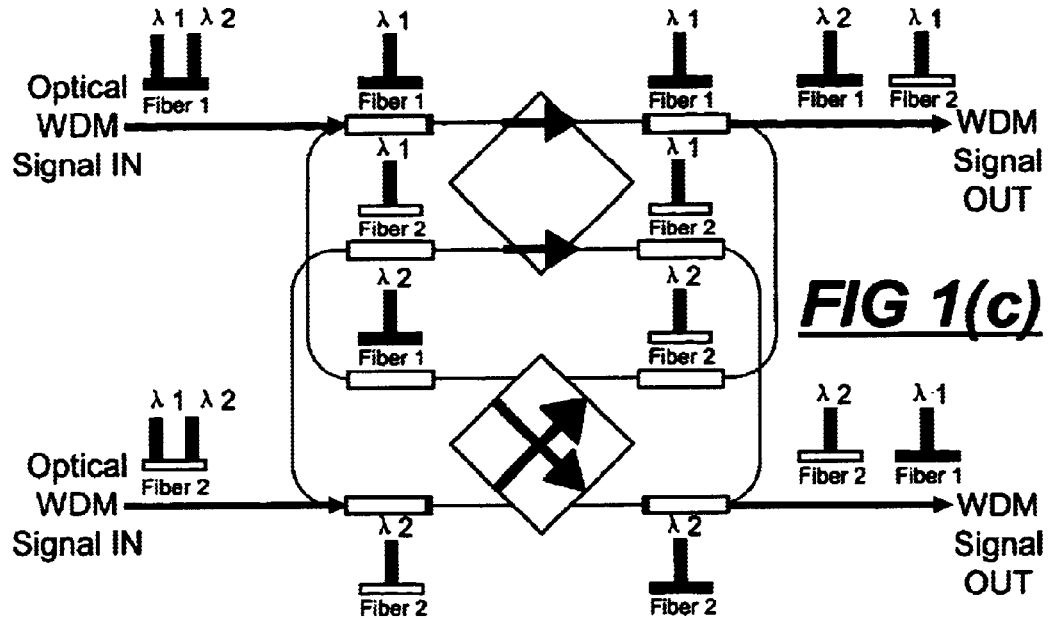

Similarly, FIG. 1(c) shows existence of the prism 18' in the second module 12 while the prism 18 in the first module 10 not, where the signals of $\lambda_2$ are controlled/regulated, and thus only the $\lambda_2$ signals from the input fibers 20, 22 are switched in the system. In other words, the first output fiber 24 carries the original first $\lambda_1$ signal from the first input fiber 20 while with the second $\lambda_2$ signal from the second input fiber 22. Correspondingly, the second output fiber 26 carries the original second $\lambda_1$ signal from the second input fiber 22 while with the first $\lambda_2$ signal from the first input fiber 20.

Figure 1D:
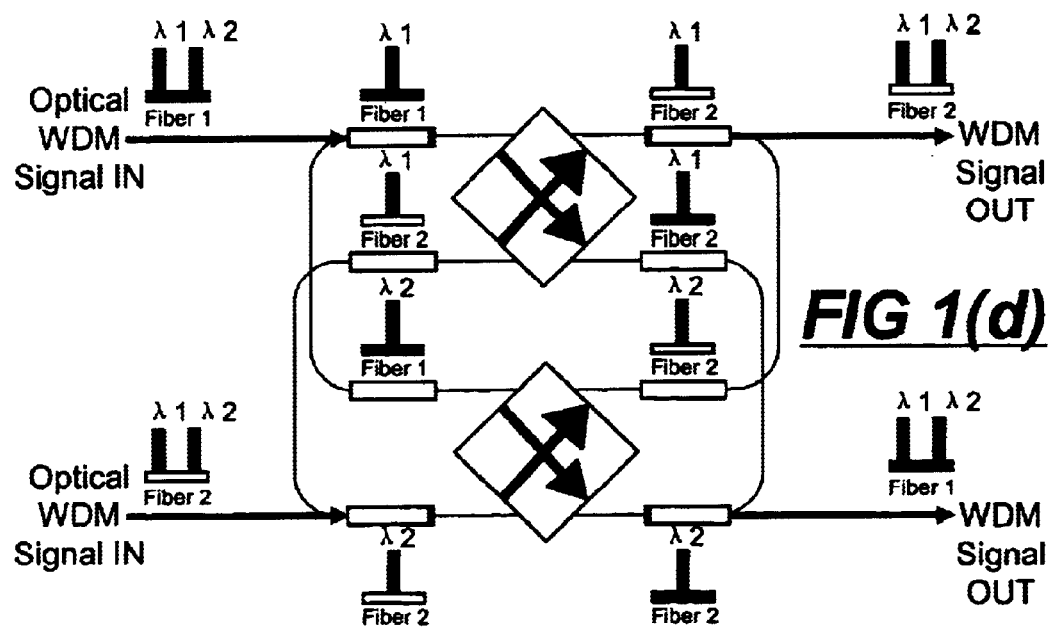

FIG. 1(d) shows existence of the prisms 18 and 18' of both the first module 10 and the second module 12 where signals of $\lambda_1$ and $\lambda_2$ are respectively controlled/regulated, and thus both the $\lambda_2$ signals from the input fibers 20, 22 are switched in the system. In other words, the first output fiber 24 carries the original second $\lambda_1$ and $\lambda_2$ signals from the second input fiber 20. Correspondingly, the second output fiber 26 carries the original first $\lambda_1$ and $\lambda_2$ signals from the first input fiber 22.

The above four variations of this system can be calculated from the equation: number of variations=$2^N$ wherein 2 indicates the number of possibility of switching result of each switching prism, and N represents the number of the modules used in the system. As mentioned before, because each module generally regulates/controls one wavelength signal, in this embodiment there are two wavelengths $\lambda_1$ and $\lambda_2$ signals are involved, thus requisitely using two modules 10 and 12. As a result, there are four variations according to the aforementioned formula $2^N$ wherein N is equal 2. Understandably, if only one wavelength signal is involved, then only one module is used as shown in the aforementioned copending application Ser. No. 09/750,737. As a result disclosed in such copending application, there are two variations according to the aforementioned formula $2^N$ wherein N is equal 1. Similarly, FIGS. 2(a)–2(p) show four different wavelengths $\lambda_1$, $\lambda_2$, $\lambda_3$ and $\lambda_4$ are involved in the switching arrangement. Thus, there are four modules 10 are required in practice and it results in sixteen variations according to the aforementioned formula $2^N$ wherein N is equal 4.

Figure 2B:
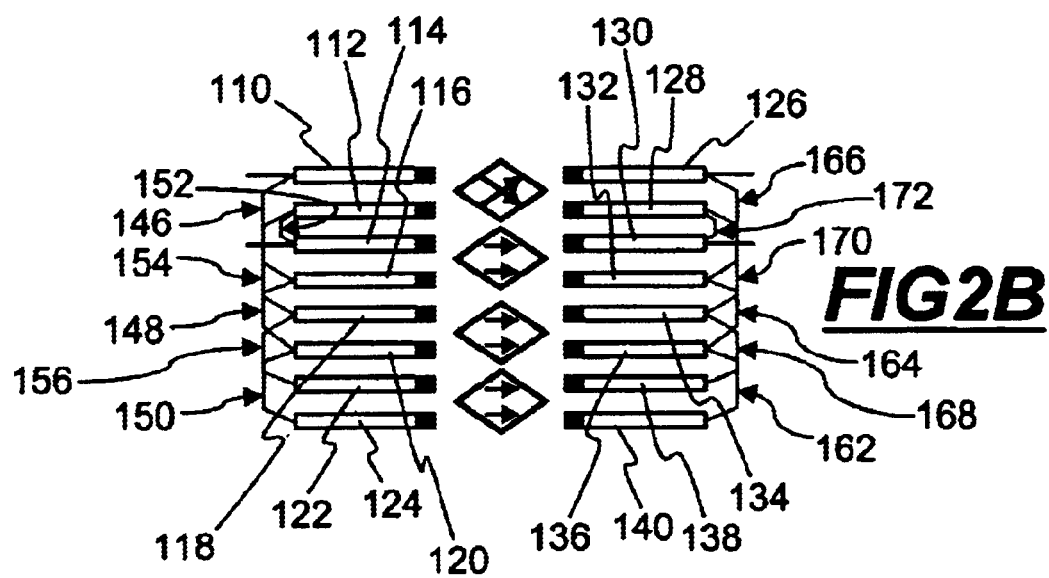

As shown in FIGS. 2(a) & 2(b), four switch modules 102, 104, 106 and 108 are respectively provided with prisms 101, 103, 105 and 107 and pairs of input collimators 110/112, 114/116, 118/120 and 122/124 on same sides with regard to the corresponding prisms. First and second input fibers 142 and 144 are respectively connected to the input collimator 110 of the switch module 102 and the input collimator 114 of the switch module 104. A first set of input jumper fibers 146, 148 and 150 corresponding to the first input fiber 142, sequentially connect the input collimator 110 of the switch module 102, the input collimator 116 of the switch module 104, the input collimator 120 of the switch module 106, and the input collimator 124 of the switch module 108 one another in series. Similarly, a second set of input jumper fibers 152, 154 and 156 corresponding to the second input fiber 144, sequentially connect the input collimator 114 of the switch module 104, the input collimator 112 of the switch module 102, the input collimator 118 of the switch module 106, and the input collimator 122 of the switch module 108 one another in series.

Oppositely, pairs of output collimators 126/128, 130/132, 134/136 and 138/140 are respectively provided on the same sides of the switch modules 102, 104, 106 and 108 relative to the corresponding prisms. First and second output fibers 158 and 160 are respectively connected to the output collimator 126 of the switch module 102, and the output collimator 130 of the switch module 104. A first set of output jumper fibers 162, 164 and 166 sequentially connect the output collimator 140 of the switch module 108, the output collimator 136 of the switch module 106, the output collimator 132 of the switch module 104, and the output collimator 126 of the switch module 102 one another in series. Similarly, the second set of output jumper fibers 168, 170 and 172 sequentially connect the output collimator 138 of the switch module 108, the output collimator 134 of the switch module 106, the output collimator 128 of the switch module 102, and the output collimator 130 of the switch module 104 one another in series.

As shown in FIG. 2(a), the first input fiber 142 carries signals of $\lambda_1$, $\lambda_2$, $\lambda_3$ and $\lambda_4$ represented as $\lambda_1(1)$, $\lambda_2(1)$, $\lambda_3(1)$ and $\lambda_4(1)$. Similarly, the second input fiber 144 respectively carries different signals at the same wavelengths $\lambda_1$, $\lambda_2$, $\lambda_3$ and $\lambda_4$ and represented as $\lambda_1(2)$, $\lambda_2(2)$, $\lambda_3(2)$ and $\lambda_4(2)$. Similar to arrangement of the previous embodiment, the pair of input collimators 110, 112 and the pair of output collimators 126, 128 of the switch module 102 only transmit the signal of $\lambda_1$ and reflect the others. With the same principle, the pair of input collimators 114, 116 and the pair of output collimator 130, 132 of the switch module 104 only transmit the signal of $\lambda_2$ and reflect the others, the pair of input collimators 118, 120 and the pair of output collimator 134, 136 of the switch module 106 only transmit the signal of $\lambda_3$ and reflect the others, and the pair of input collimators 120, 122 and the pair of output collimator 138, 140 of the switch module 108 only transmit the signal of $\lambda_4$ and reflect the others.

Under this rule, as shown in FIG. 2(a) where all the prisms 101, 103, 105 and 107 are in the "inactive" status, the signal of $\lambda_1(1)$ passes the input collimator 110 and the output collimator 126 of the switch module 102 to enter the first output fiber 158.

Signals of $\lambda_2(1)$ with those of $\lambda_3(1)$ and $\lambda_4(1)$ are reflected by the input collimator 110 of the switch module 102 and, via the input jumper fiber 146 of the first set of input jumper fibers, enter the input collimator 116 of the switch module 104 wherein only the signal of $\lambda_2(1)$ passes the input collimator 116 of the switch module 104 and further passes the output collimator 132 thereof and successively enters the output collimator 126 of the switch module 102 via the output jumper fiber 166 of the first set of output jumper fibers, and finally is reflected therefrom toward the first output fiber 158 to join the signal of $\lambda_1(1)$ coming from the other side of the same output collimator 126.

Following the same rule, signals of $\lambda_3(1)$ and $\lambda_4(1)$ which are reflected by and leave from the input collimator 116 of the switch module 104, enter the input collimator 120 of the switch module 106 via the input jumper fiber 148, wherein only the signal of $\lambda_3(1)$ passes therethrough and further passes the output collimator 136 thereof and successively enters the output collimator 132 of the switch module 104 via the output jumper 164 of the firs set of output jumper fibers. The signal of $\lambda_3(1)$ is further reflected by and leaves from the output collimator 132 to join the signal of $\lambda_2(1)$ coming from the other side of the same output collimator 132 for entering the output jumper fiber 166 and finally toward the first output fiber 158 by following the aforementioned "outgoing" path of the signal of $\lambda_2(1)$.

Signal of $\lambda_4(1)$ reflected by the input collimator 120 of the switch module 106 and separated from signal of $\lambda_3(1)$, enters the input collimator 124 of the switch module 108 via the input jumper fiber 150 of the first set of input jumper fibers. The signal of $\lambda_4(1)$ passes the input collimator 124 and the output collimator 140 and enters the output collimator 136 of the switch module 106 via the output jumper fiber 162 of the first set of output jumper fibers and is reflected by the output collimator 136 to join the signal of $\lambda_3(1)$ coming from the other side of the output collimator 136 for entering the output jumper fiber 164 of the first set of output jumper fibers and finally entering the first output fiber 158 by following the "outgoing" path of the signal of $\lambda_3(1)$.

Under this situation, all of the signals of $\lambda_1(1)$, $\lambda_2(1)$, $\lambda_3(1)$ and $\lambda_4(1)$ are leaving from the first output fiber 158.

With the same principle, signals of $\lambda_1(2)$, $\lambda_2(2)$, $\lambda_3(2)$ and $\lambda_4(2)$ coming from the second input fiber 144 allow the signal of $\lambda_2(2)$ to pass through the input collimator 114 and the output collimator 130 of the switch module 104, and finally enter the second output fiber 160.

Signals of $\lambda_1(2)$, $\lambda_3(2)$ and $\lambda_4(2)$ are reflected by the input collimator 114 of the switch module 104 and, via the input jumper fiber 152 of the first set of input jumper fibers, enter the input collimator 112 of the switch module 102 wherein only the signal of $\lambda_1(2)$ passes the input collimator 112 and further passes the output collimator 128 thereof and successively enters the output collimator 130 of the switch module 104 via the output jumper fiber 172 of the second set of output jumper fibers, and finally is reflected therefrom toward the second output fiber 160 to join the signal of $\lambda_2(2)$ coming from the other side of the same output collimator 130.

Following the same rule, signals of $\lambda_3(2)$ and $\lambda_4(2)$ which are reflected by and leave from the input collimator 112 of the switch module 102, enter the input collimator 118 of the switch module 106 via the input jumper fiber 154, wherein only the signal of $\lambda_3(2)$ passes therethrough and further passes the output collimator 134 thereof and successively enters the output collimator 128 of the switch module 102 via the second jumper fiber 170 of the second set of output jumper fibers. The signal of $\lambda_3(2)$ is further reflected by and leaves from the output collimator 128 to join the signal of $\lambda_1(2)$ coming from the other side of the same output collimator 128 for entering the output jumper fiber 172 and finally toward the second output fiber 160 by following the aforementioned "outgoing" path of the signal $\lambda_1(2)$.

Signal of $\lambda_4(2)$ reflected by the input collimator 118 of the switch module 106 and separated from the signal of $\lambda_3(2)$, enters the input collimator 122 of the switch module 108 via the input jumper fiber 156 of the first set of input jumper fibers. The signal of $\lambda_4(2)$ passes the input collimator 122 and the output collimator 138 thereof, and enters the output collimator 134 via the output jumper 168 of the second set of output jumper fibers, and is reflected by the output collimator 134 to join the signal of $\lambda_3(2)$ coming from the other side of the output collimator 134 for entering the output jumper fiber 170 of the second set of output jumper fibers and finally entering the output jumper fiber 172 by following the "outgoing" path of the signal $\lambda_3(2)$.

Under this situation, all of the signals of $\lambda_1(2)$, $\lambda_2(2)$, $\lambda_3(2)$ and $\lambda_4(2)$ are leaving from the second output fiber 160 in comparison with the signals of $\lambda_1(1)$, $\lambda_2(1)$, $\lambda_3(1)$ and $\lambda_4(1)$ being leaving from the first output fiber 158. This is one of sixteen variations mentioned earlier.

FIG. 2(b) presents the different variation where the prism 101 is active in the switch module 102 which controls $\lambda_1$. Under this situation, signals of $\lambda_1(1)$ and $\lambda_1(2)$ which pass the switch module 102 will exchange with each other. Thus, in comparison with the outgoing result shown in FIG. 2(a) where the first output fiber 158 contains signals of $\lambda_1(1)$, $\lambda_2(1)$, $\lambda_3(1)$ and $\lambda_4(1)$ and the second output fiber 160 contains signals of $\lambda_1(2)$, $\lambda_2(2)$, $\lambda_3(2)$ and $\lambda_4(2)$, the result in FIG. 2(b) shows the first output fiber 158 contains signals of $\lambda_1(2)$, $\lambda_2(1)$, $\lambda_3(1)$ and $\lambda_4(1)$ and the second output fiber 160 contains the signals of $\lambda_1(1)$, $\lambda_2(2)$, $\lambda_3(2)$ and $\lambda_4(2)$ where signals of $\lambda_1(1)$ and $\lambda_1(2)$ have exchanged with each other in the first and second output fibers 158, 160.

Figure 2C:
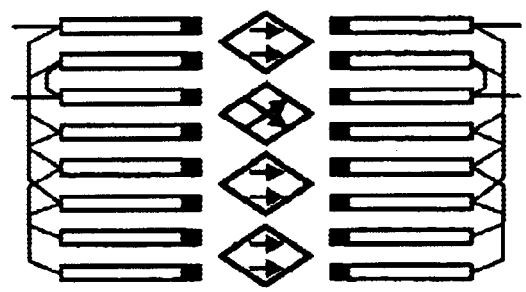

With the same pattern, FIG. 2(c) shows the prism 103 of the switch module 104 controlling $\lambda_2$, is active and the outcome of the first output fiber 158 contains $\lambda_1(1)$, $\lambda_2(2)$, $\lambda_3(1)$ and $\lambda_4(1)$ and that of the second output fiber 160 contains $\lambda_1(2)$, $\lambda_2(1)$, $\lambda_3(2)$ and $\lambda_4(2)$. Similarly, the other thirteen variations can be listed as follows.

Figure 2D:
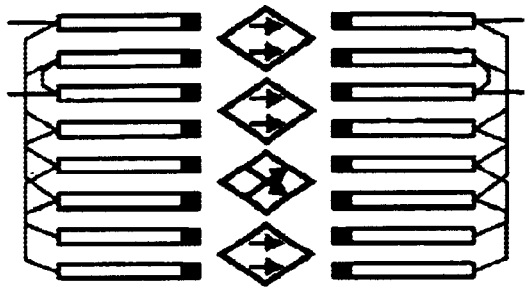

In FIG. 2(d), the prism 105 of the switch module 106 controlling $\lambda_3$ is active and the outcome of the first output fiber 158 contains $\lambda_1(1)$, $\lambda_2(1)$, $\lambda_3(2)$ and $\lambda_4(1)$ and the outcome of the second output fiber 160 contains $\lambda_1(2)$, $\lambda_2(2)$, $\lambda_3(1)$ and $\lambda_4(2)$.

Figure 2E:
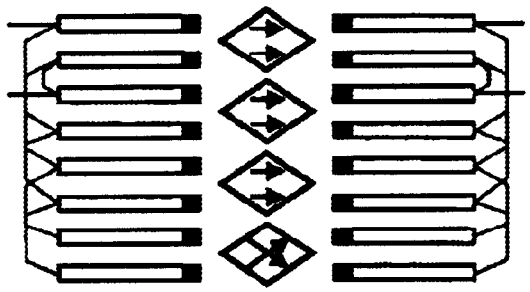

In FIG. 2(e), the prism 107 of the switch module 108 controlling $\lambda_4$ is active and the outcome of the first output fiber 158 contains $\lambda_1(1)$, $\lambda_2(1)$, $\lambda_3(1)$ and $\lambda_4(2)$ and the outcome of the second output fiber 160 contains $\lambda_1(2)$, $\lambda_2(2)$, $\lambda_3(2)$ and $\lambda_4(1)$.

Figure 2F:
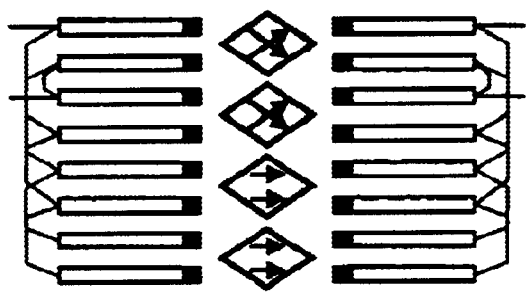

In FIG. 2(f), both the prism 101 of the switch module 102 controlling $\lambda_1$ and the prism 103 of the switch module 104 controlling $\lambda_2$ are active and the outcome of the first output fiber 158 contains $\lambda_1(2)$, $\lambda_2(2)$, $\lambda_3(1)$ and $\lambda_4(1)$ and the outcome of the second output fiber 160 contains $\lambda_1(1)$, $\lambda_2(1)$, $\lambda_3(2)$ and $\lambda_4(2)$.

Figure 2G:
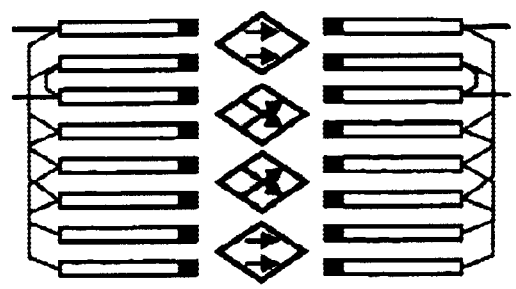

In FIG. 2(g), both the prism 103 of the switch module 104 controlling $\lambda_2$ and the prism 105 of the switch module 106 controlling $\lambda_3$ are active and the outcome of the first output fiber 158 contains $\lambda_1(1)$, $\lambda_2(2)$, $\lambda_3(2)$ and $\lambda_4(1)$ and the outcome of the second output fiber 160 contains $\lambda_1(2)$, $\lambda_2(1)$, $\lambda_3(1)$ and $\lambda_4(2)$.

Figure 2H:
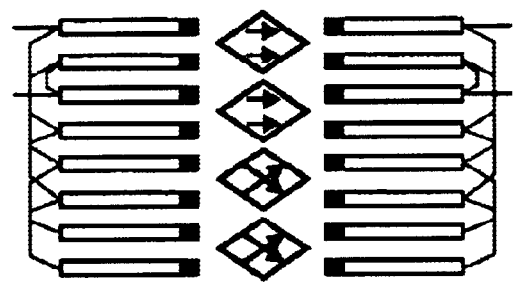

In FIG. 2(h), both the prism 105 of the switch module 106 controlling $\lambda_3$ and the prism 107 of the switch module 108 controlling $\lambda_4$ are active and the outcome of the first output fiber 158 contains $\lambda_1(1)$, $\lambda_2(1)$, $\lambda_3(2)$ and $\lambda_4(2)$ and the outcome of the second output fiber 160 contains $\lambda_1(2)$, $\lambda_2(2)$, $\lambda_3(1)$ and $\lambda_4(1)$.

Figure 2I:
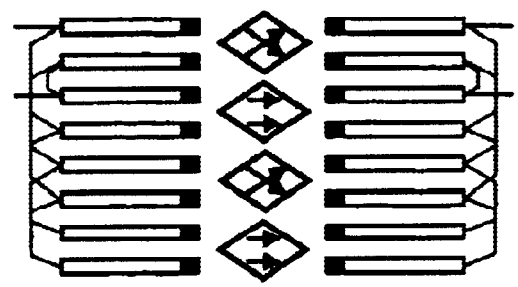

In FIG. 2(i), both the prism 101 of the switch module 102 controlling $\lambda_1$ and the prism 105 of the switch module 106 controlling $\lambda_3$ are active and the outcome of the first output fiber 158 contains $\lambda_1(2)$, $\lambda_2(1)$, $\lambda_3(2)$ and $\lambda_4(1)$ and the outcome of the second output fiber 160 contains $\lambda_1(1)$, $\lambda_2(2)$, $\lambda_3(1)$ and $\lambda_4(2)$.

Figure 2J:
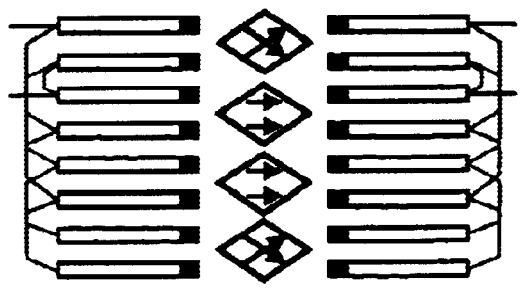

In FIG. 2(j), both the prism 101 of the switch module 102 controlling $\lambda_1$ and the prism 107 of the switch module 108 controlling $\lambda_4$ are active and the outcome of the first output fiber 158 contains $\lambda_1(2)$, $\lambda_2(1)$, $\lambda_3(1)$ and $\lambda_4(2)$ and the outcome of the second output fiber 160 contains $\lambda_1(1)$, $\lambda_2(2)$, $\lambda_3(2)$ and $\lambda_4(1)$.

Figure 2K:
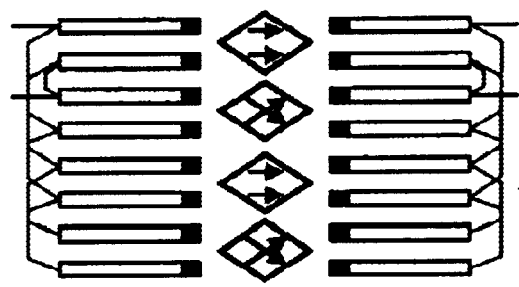

In FIG. 2(k), both the prism 103 of the switch module 104 controlling $\lambda_2$ and the prism 107 of the switch module 108 controlling $\lambda_4$ are active and the outcome of the first output fiber 158 contains $\lambda_1(1)$, $\lambda_2(2)$, $\lambda_3(1)$ and $\lambda_4(2)$ and the outcome of the second output fiber 160 contains $\lambda_1(2)$, $\lambda_2(1)$, $\lambda_3(2)$ and $\lambda_4(1)$.

Figure 2L:
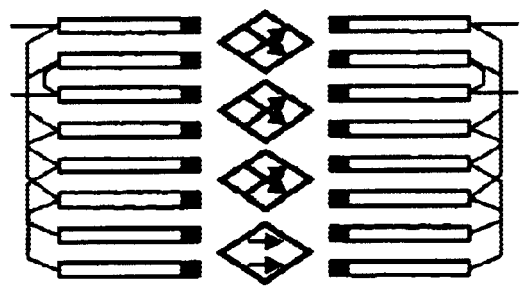
Figure 2M:
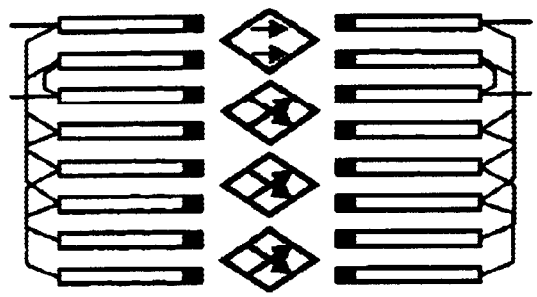
Figure 2N:
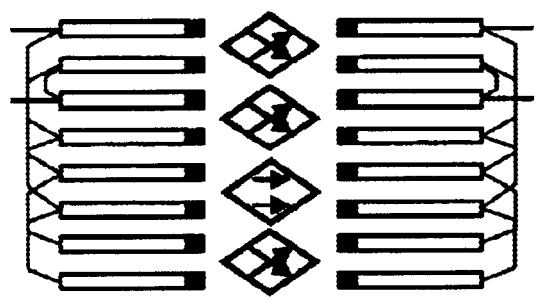
Figure 2O:
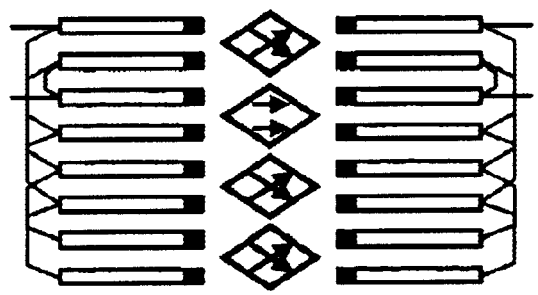
Figure 2P:
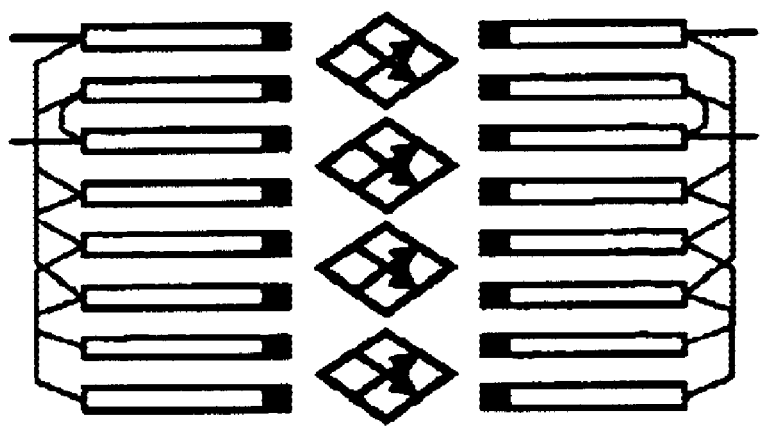

In FIG. 2(l), all three the prism 101 of the switch module 102 controlling $\lambda_1$, the prism 103 of the switch module 104 controlling $\lambda_2$ and the prism 105 of the switch module 106 controlling $\lambda_3$ are active and the outcome of the first output fiber 158 contains $\lambda_1(2)$, $\lambda_2(2)$, $\lambda_3(2)$ and $\lambda_4(1)$ and the outcome of the second output fiber 160 contains $\lambda_1(1)$, $\lambda_2(1)$, $\lambda_3(1)$ and $\lambda_4(2)$.

In FIG. 2(*m*), the prism 103 of the switch module 104 controlling $\lambda_2$, the prism 105 of the switch module 106 controlling $\lambda_3$ and the prism 107 of the switch module 108 controlling $\lambda_4$ are active and the outcome of the first output fiber 158 contains $\lambda_1(1)$, $\lambda_2(2)$, $\lambda_3(2)$ and $\lambda_4(2)$ and the outcome of the second output fiber 160 contains $\lambda_1(2)$, $\lambda_2(1)$, $\lambda_3(1)$ and $\lambda_4(1)$.

In FIG. 2(*n*), the prism 101 of the switch module 102 controlling $\lambda_1$, the prism 103 of the switch module 104 controlling $\lambda_2$ and the prism 107 of the switch module 108 controlling $\lambda_4$ are active and the outcome of the first output fiber 158 contains $\lambda_1(2)$, $\lambda_2(2)$, $\lambda_3(1)$ and $\lambda_4(2)$ and the outcome of the second output fiber 160 contains $\lambda_1(1)$, $\lambda_2(1)$, $\lambda_3(2)$ and $\lambda_4(1)$.

In FIG. 2(*o*), the prism 101 of the switch module 102 controlling $\lambda_1$, the prism 105 of the switch module 106 controlling $\lambda_3$ and the prism 107 of the switch module 108 controlling $\lambda_4$ are active and the outcome of the first output fiber 158 contains $\lambda_1(2)$, $\lambda_2(1)$, $\lambda_3(2)$ and $\lambda_4(2)$ and the outcome of the second output fiber 160 contains $\lambda_1(1)$, $\lambda_2(2)$, $\lambda_3(1)$ and $\lambda_4(1)$.

In FIG. 2(*p*), all the prism 101 of the switch module 102 controlling $\lambda_1$, the prism 103 of the switch module 104 controlling $\lambda_2$, the prism 105 of the switch module 106 controlling $\lambda_3$, and the prism 107 of the switch module 108 controlling $\lambda_4$ are active, the outcome of the first output fiber 158 contains $\lambda_1(2)$, $\lambda_2(2)$, $\lambda_3(2)$ and $\lambda_4(2)$ and the outcome of the second output fiber 160 contains $\lambda_1(1)$, $\lambda_2(1)$, $\lambda_3(1)$ and $\lambda_4(1)$.

Understandably, based on each module 102, 104, 106, 108 may provide two variations, the combination of these four modules may result in sixteen possibilities(variations) as listed above. From another viewpoint of the outcome of the output fibers, the signals of the specific wavelength $\lambda$ may be switched between two fibers by activating the prism of the corresponding switch module controlling said wavelength $\lambda$; otherwise, there is no change. It is very simple to operate. On the other hand, because the modules are cascaded with one another, the variation amount for multiple wavelengths can be significantly increased.

It is appreciated that in the above embodiments the switch prism of each switch module only switch two signal paths therein. Anyhow, other switching mechanism may also be used in this switching system wherein such switching mechanism may provide three or more than three switching paths. Correspondingly, instead of only two input(output) fibers are involved in the system, three or more than three Input(output) fibers can be implemented therewith. Under this situation, instead of two variations of the switch device as shown in the above embodiments, the total amount of the variations (i.e., of the possible outcome) of such a switching mechanism may follow the equation of M! (i.e., M×(M−1)× (M−2) . . . ×2×1) wherein M is the number of signal paths and is essentially equal to the number of the input(output) fibers in practice. This equation is derived from a math formula $_MP_M$ where P represents the total possibilities of orderly arrangement of M elements. In the above two embodiments, M=2 and then each switching module provides 2!(=2) variations. Alternately, for a switch module providing three paths adapted to cooperate with three input collimators and three output collimators, there would be 3!(=6) variations. Moreover, following the formula disclosed in the aforementioned embodiments, when N wavelengths are involved, N switch modules are required to be used in the system and the number of the total variations may be $(M!)^N$. In the practical sample, M=2 and N=8. Thus, there are $2^8$=256 variations during transmission.

It is appreciated that regardless of how many switch modules are used for switching the same corresponding number of channels between two or among more than two fibers, such switch modules should be interconnected one another via jumper fibers to form cascading therebetween. It is also noted there is no absolute sequence for these switch modules either for jumper fiber connection or even the input/output fiber position(s). For example, the input fiber may be located in the third switch, or the jumper fiber may be connected between the first switch module and the fourth switch module. Moreover, it is unnecessary for the input fibers and their associated jumper fibers on one side of the system to be symmetric with regard to the output fibers and their associated jumper fibers on the other side. For example, one input fiber may be located in one switch module while the corresponding output fiber may be located in another switch module. The general rule is that each collimator of each switch module should be connected only once via the jumper fiber(s).

Figure 3:
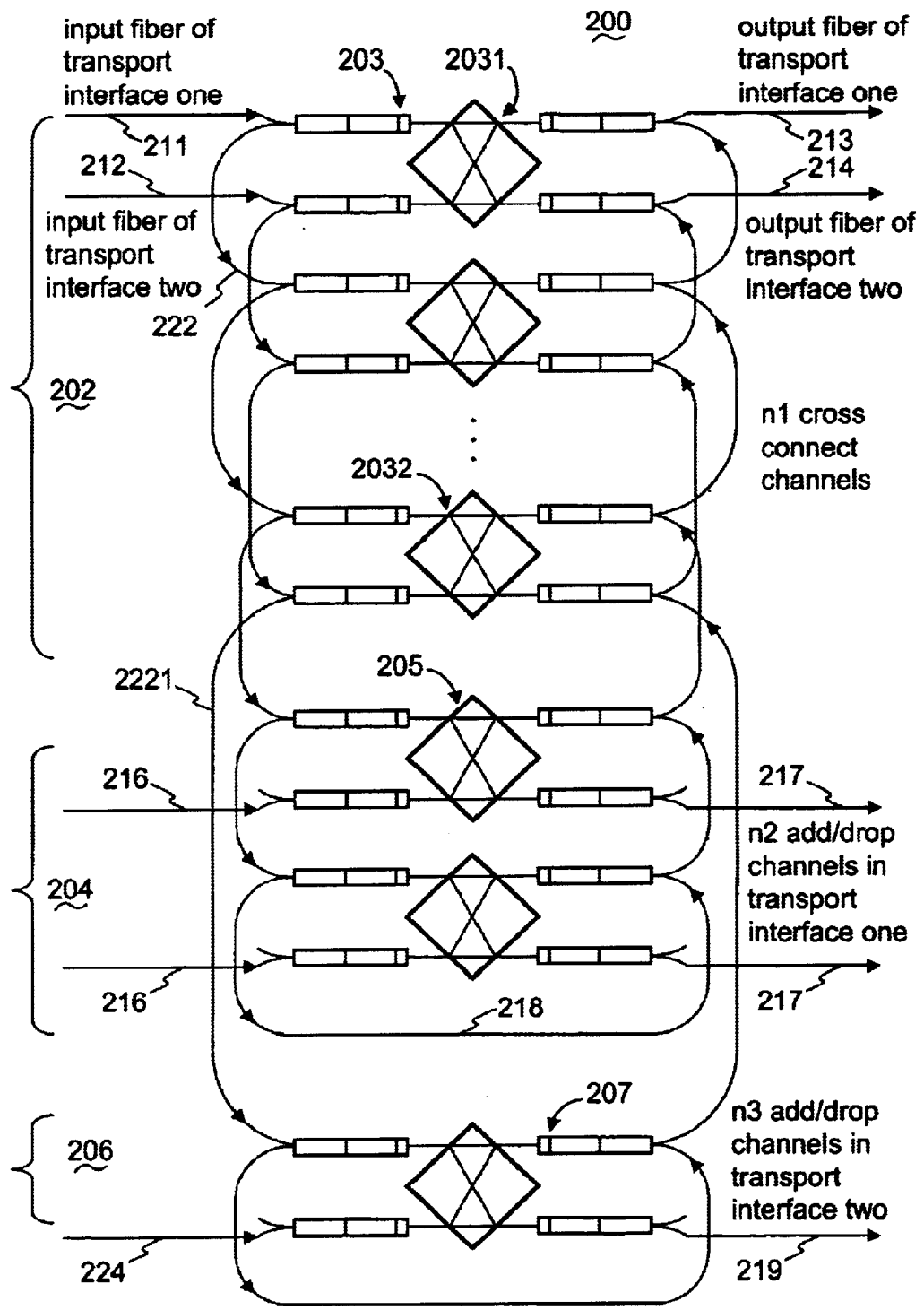
FIG. 3 shows an optical switching system in a form of the generic re-configurable WDM optical cross connection device.

FIG. 3 shows another embedment using the basis structure disclosed in the aforementioned two embodiment to complete an optical switch system in practice. The optical switching system 200 comprising three sections wherein the first section is the switching region 202 having the similar arrangement disclosed in the earlier two embodiments wherein there are $N_1$ ($N_1$=8 in this embodiment) switch modules 203, for switching $N_1$ channels, in a cross-connection manner with one another via corresponding jumper fibers 222.

It is noted that different from the aforementioned two embodiments where the first input fiber and the second input fiber are respectively connected to the different switch modules, in this embodiment the first input fiber 211 and the second input fiber 212 respectively connects to the pair of input collimators of the first module 2031.

A second section is the first add/drop region 204 wherein there are $N_2$ ($N_2$=2 in this embodiment) switch modules 205, for adding/dropping $N_2$ channels, in a cross-connection manner with one another. Different from what are arranged in the first section, (i.e., the switching region 202), the subject switch modules 205 do not connect to the signals from the second input fiber 212. In other words, the signals of the second input fiber 212, entering the switching region 202 from the first switch module 2031 and leaving out of the last switch module 2032, bypasses the first add/drop region 204 via the corresponding jumper fiber 2221. In contrast, without receiving any signals from the second input fiber 212, for the pair of input collimators of each of the switch modules 205, one is connected to the incoming signals from the first input fiber transmitted from the switching region 202 or from the front neighboring switch module 205, while the other is connected to an external add fiber 216.

Similar to what is disclosed in the earlier filed copending application Ser. No. 09/750,737, the signal from the first input fiber with the specific center wavelength compliant with the switch module 205, will be exchanged with another signal having the same center wavelength from the add fiber 216. In other words, the original signal will be dropped from the drop fiber 217 while the added signal will join the other signals, passing the switching region 202, toward the first output fiber 213 located on the output collimator of the first switch module 2031. Understandably, similar to what is arranged in the switching region 202, the cascading arrangement among the switch modules 205 also provides multiplexing and demultiplexing for the transmitted combined signals. It is noted that there is a jumper fiber 218 connected between one input collimator of the last switch module in the second section, (i.e., the first add/drop section 204) where the cascading arrangement is applied but without the add fiber, and one output collimator which is a partner of that input collimator. With this jumper fiber 218, the other (remaining) channels (wavelengths) which are not coupled to any of the switch modules in the first add/drop section 204, will be directed to the output collimator The third section is a second add/drop region 206 wherein there are $N_3$ ($N_3$=1 in this embodiment) switch modules 207 for adding/dropping $N_3$ channels, in a cascading manner with one another. The second add/drop region 206 is similar to the first add/drop region 204 except that the switch module 207 only receives the signals from the second input fiber 212, which bypasses the first add/drop region 204, and is exchanged with the signal from the add fiber 224 and dropped from the drop fiber 219. On the other hand, the added signal from the add fiber 224 will join the other signals, bypass the first add/drop region 204, via the switching region 202, toward the second output fiber 214 which is located on another output collimator of the first switch module 2031.

Figure 4:
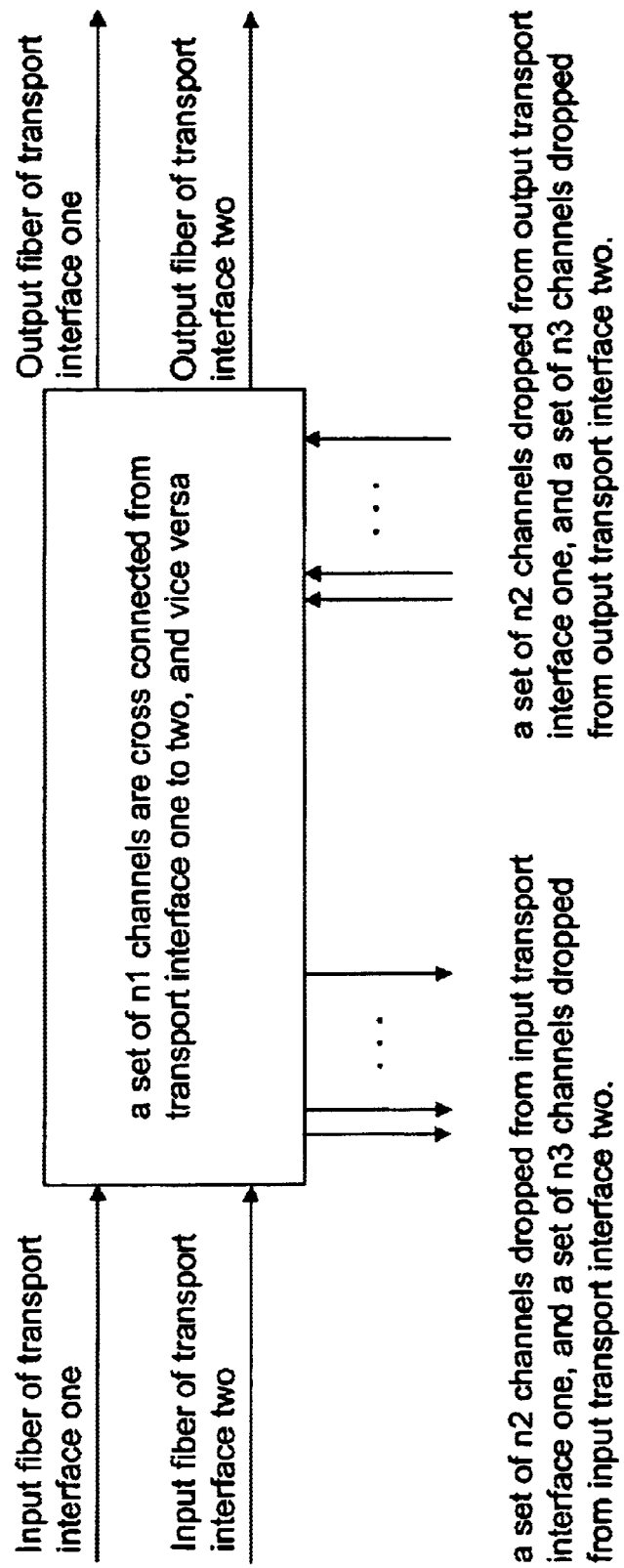
FIG. 4 is a functional block diagram of generic re-configurable WDM optical cross connection device or switching system.

It is noted that through the cross-connection and add/drop with cascading arrangement, the whole optical switch system can provide not only the switching function but also the add/dropping function. All other remaining wavelengths directly pass through the device as express channels in the transport interface. In this case, when $N_1$=0, the device functions as a pure reconfigurable add/drop device; when $N_2$=0 and $N_3$=0, the device functions as a pure cross connection device. Under this situation, two jumper fibers respectively connect each pair of input collimator and output collimator of the last switch module In summary, as shown in FIG. 4 where the basic building block (i.e., switch module) comprises two R-channel input dual fiber collimators, and two R-channel output dual fiber collimators and a switching prism, wherein the R-channel dual fiber collimator comprises at least a dual fiber ferrule, a lens and a WDM band pass filter. When a multi-channel WDM signal light is coupled into the collimator from one of its two pigtail fibers, the channel falls in the passband of the WDM filter will be transmitted through the collimator while the remaining channels will be reflected back and coupled out from the other fiber. The switching prism can control the light being transmitted directly pass through from an input collimator to an output collimator, or cross connection transmitted from an input collimator to another output collimator. The cross connection function is realized by cascading both input collimators in each basic building block to the next stage, and cascading the output collimators in preferably the same pattern as the input collimators systematically. The add/drop function can be realized by cascading only one input collimator in each basic building block to the next stage, and cascading one corresponding output collimator in preferably the same pattern as the input collimator, and the remaining, not cascaded, input collimator in each basic building block is used to provide the input pigtail fiber for the add port, and the remaining, not cascaded, output collimator in each basic building block is used to provide the output pigtail fiber for the drop port. In this way, there are two transport interfaces each with a pair of input fiber and output fiber (e.g., input fibers 20, 22 and output fibers 24, 26 in the first embodiment). An n1 channels (wavelengths) optical WDM signal transmits through transport interface one, and another n2 channels (wavelengths) optical WDM signal transmits through transport interface two. In these channels, N1 of them are cross connected from transport interface one to two, and vice versa. The set of N1 channels are included within both the n1 and n2 channels, respectively. In the mean time, a set of N2 channels from the n1 channels can be added/dropped in and from the transport interface one, while a set of N3 channels from the n2 channels can be add/dropped in and from the transport interface two, wherein the set of N2 channels from the n1 channels is excluded from the set of N1, and the set of N3 from the n2 channels are excluded from the set of N1. Understandably, N2 and N3 can either completely or partially overlap with each other. All other channels not belong to N1, N2 and N3 will transport directly through the transport interface without switching or adding/dropping. It is also appreciated that in the current embodiment, according to the arrangement order among the cross-connection group and the add/drop group, N2 channels and N3 channels are excluded from N1 channels. Anyhow, via the different arrangement order or using the switch prism providing more than two signal paths, N2 channels and N3 channels might be included in N1 channels. In other words, the switch system may provide both the add/drop and cross-connection functions for the same channel in two incoming signals.

It is understood that even though the preferred embodiment only disclose the 2×2 switching device, the N transport interfaces by utilizing N×N switches in the base building block can be implemented based on the spirit of the invention. In addition to the disclosed prism, other switching mechanisms, e.g., thermo-optic switch, MEMS, etc, may be utilized in this system.

It is noted that the collimators used with the add/drop way may have one of the dual fibers idle as well as those input collimators which do not further connect to another input collimator or those output collimators which do not receive the fibers from another output collimators. For those specific collimators, the associated dual fibers may be simplified as a signal fiber theoretically. It is also noted in the first and second embodiments the input fibers only carry the exact channels the switch modules function to, so it is unnecessary to an additional jumper fiber to connect between the last input collimator and the last output collimator to bypass the channels of the input signals which are not affected by any of the switch modules. Differently, in the third embodiment, such a jumper fiber 218 is provided between the last input collimator and the last output collimator. Moreover, as mentioned before it may not be necessary for the input fibers and the output fibers to be connected to the same switch module(s) either in the cross connection group or in the add/drop group. Moreover, the different input fibers may be respectively connected to the input collimators of the different switch modules, and the output fiber as well.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. An optical switch system comprising:

N first type switch modules each including:

M dual fiber input collimators;

M dual fiber output collimators; and a switching device moveably positioned between said input collimators and said output collimators, said switching device configured to provide M signal paths for optionally switching signals coming said M input collimators toward said M output collimators;

M input fibers respectively bringing signals in and connected to the corresponding input collimators of at least one of said first type switch modules;

M output fibers respectively taking signals out and connected to the corresponding output collimators of at least one of said first type switch modules;

said input collimators of each of said first type switch modules cascading the corresponding input collimators of another of said first type switch modules; and said output collimators of each of said first type switch modules cascading the corresponding output collimators of another of said first type switch modules; wherein M and N are integers, and said signals coming from the input fibers leaves from the output fibers under a condition that N channels of said signals in the M input fibers have been selectively switched by said N first type switch modules.

2. The system as described in claim 1, wherein there are $(M!)^N$ variations of the signals leaving from the output fibers in the system according to existence or non-existence of the corresponding switching devices for the corresponding channels.

3. The system as described in claim 1, wherein M=2.

4. The system as described in claim 3, wherein N=2, 4 or 8.

5. The system as described in claim 1, wherein said input fibers are connected to more than one first type switch modules.

6. The system as described in claim 1, wherein said output fibers are connected to more than one first type switch modules.

7. The system as described in claim 1, wherein said N switch modules are for cross-connection use to selectively switch the signals in said M input fibers.

8. The system as described in claim 1, wherein a plurality of input jumper fibers are connected between the input collimators of the corresponding first type switch modules for cascading.

9. The system as described in claim 8, wherein most of said input collimators and output collimators are cascaded once.

10. The system as described in claim 1, further including N1 second type switch modules for add/drop use, each of said second type switch modules including two dual fiber input collimators and two dual fiber output collimators with another switching device moveably positioned therebetween, wherein N1 is an integer.

11. The system as described in claim 10, wherein in the second type switch modules, a plurality of input jumper fibers are connected between the input collimators thereof and a plurality of output jumper fibers are connected between the output collimators thereof.

12. The system as described in claim 11, wherein at least one input jumper fiber is connected between the input collimator of one of the first type switch modules and the input collimator of one of the second type switch module to link the first type switch modules and the second type switch modules, and at least one output jumper fiber is connected between the output collimator of one of the first type switch modules and the output collimator of one of the second type switch modules correspondingly.

13. The system as described in claim 10, wherein said N1 second type switch modules substantially used with only one of said M input fibers.

14. The system as described in claim 13, wherein another N2 second type switch modules is linked to the first type switch modules via jumper cables for use with another of said M input fibers.

15. The system as described in claim 1, wherein the first type switch modules are used for different channels with one another.

16. An optical switch system comprising:

a cross connection group including:

a plurality of switch modules cascading with one another for use with different channels, each of said switch modules including two input collimators and two output collimators with a moveable two-signal-way switching device therebetween;

two input fibers respectively connected to the corresponding input collimators of at least one switch modules;

two output fibers respectively connected to the corresponding output collimators of at least one switch modules; and jumper fibers each connected between the two corresponding input collimators of two different switch modules, or between two corresponding output collimators of two different switch modules.

17. The system as described in claim 16, wherein an output in the two output fibers owns $2^N$ variations depending on existence or non-existence of the switching devices, where N is the number of the switch modules.

18. The system as described in claim 16, wherein said switch modules relate to different channels, respectively.

19. The system as described in claim 16, wherein an add/drop group is linked to said cross connection group so as to have the output fiber include new added signals other than what are originally in said two input fibers.

20. An optical switch system comprising:

a cross connection group and an add/drop group linked to each other;

said cross connection group including a plurality of first switch modules each including input collimators and output collimators with a moveable switching device therebetween;

said add/drop group including a plurality of second switch modules each including input collimators and output collimators with a moveable switching device therebetween;

a plurality of jumper fibers cascading the first switch modules and the second switch modules; and external add fibers connected to the input collimators of the second switch modules, and input fibers selectively connected to the collimators of one of said first switch modules and said second switch modules.

21. The system as described in claim 20, wherein output fibers are connected to the output collimators of one of said first switch modules and said second modules.

22. The system as described in claim 20, wherein channels defined in the first switch modules are different from those in the second channels.

23. The system as described in claim 20, wherein two sets of second switch modules are provided respectively used for signals from different input fibers.

24. The system as described in claim 20, wherein signals leave from the output fibers include some from the external add fibers other than said input fibers.

25. A method of signal arrangement comprising:

providing a plurality of switch modules each including input collimators and output collimators with a moveable switching device therebetween;

providing input fibers connected to the input collimators of at least one of said switch modules;

providing a plurality of jumper fibers cascading the input collimators of the different switch modules; and providing a plurality of output fibers connected to the output collimators of at least one of said switch modules; wherein specific channels of signals from said input fibers are successively selectively switched by said switch modules, respectively.

26. The method as described in claim 25, wherein an output of the signal from the output fibers own $(M!)^N$ variations where M is the number of the input fibers and N is the number of the switch modules.

27. A method of signal arrangement comprising:

providing a series of switch modules each including more than one collimators and more than one output collimators with a moveable switching device therebetween;

inputting more than one input signals entering the corresponding more than one collimators;

cascading said switch modules; and demultiplexing said input signals via said input collimators, and simultaneously selectively switching channels dropped by said input collimators;

multiplexing dropped channels one by one via said output collimators; and outputting more than one output signals wherein channels of the input signals, which have passed the switching device, are selectively switched with each other while the remaining channels are not.

28. A method of signal arrangement comprising:

providing a cross connection group and an add/drop group linked to each other;

providing said cross connection group with a plurality of first type switch modules each including input collimators and output collimators with a moveable switching device therebetween;

providing said add/drop group with a plurality of second type switch modules each including input collimators and output collimators with a moveable switching device therebetween;

providing a plurality of jumper fibers cascading the different switch modules;

providing input fibers connected to the input collimators of at least one of said first and second switch modules; and providing a plurality of output fibers connected to the output collimators of at least one of said first and second switch modules; wherein specific channels of signals from said input fibers are successively selectively switched by said first switch modules, respectively, and/or specific channels of signals from said input fibers are dropped and replaced by the newly added channels from the external add fibers by said second type switching device.

29. The method as described in claim 28, wherein two sets of jumper fibers mutually exclusively cascading the switch modules for compliance with the number of input collimators or output collimators of each of said switch modules.

* * * * *